(12) United States Patent
Newton

(10) Patent No.: US 7,398,803 B2
(45) Date of Patent: *Jul. 15, 2008

(54) IDENTIFICATION AND COMMUNICATION SYSTEM FOR INFLATABLE DEVICES

(75) Inventor: Michael David Newton, Machan (GB)

(73) Assignee: Huntleigh Technology LTD (GB)

( * ) Notice: Subject to any disclaimer, the term of this patent is extended or adjusted under 35 U.S.C. 154(b) by 819 days.

This patent is subject to a terminal disclaimer.

(21) Appl. No.: 10/680,623

(22) Filed: Oct. 7, 2003

(65) Prior Publication Data

US 2004/0127937 A1 Jul. 1, 2004

Related U.S. Application Data

(63) Continuation-in-part of application No. 09/509,265, filed as application No. PCT/GB99/02403 on Jul. 23, 1999, now Pat. No. 6,884,255.

(30) Foreign Application Priority Data

Jul. 25, 1998 (GB) ................................. 9816173.0

(51) Int. Cl.
*B65B 1/30* (2006.01)
(52) U.S. Cl. ............................. 141/95; 141/10; 141/83; 141/94; 141/114; 340/10.1; 606/202
(58) Field of Classification Search .................. 141/10, 141/83, 94, 95, 114; 340/10.1, 10.3; 606/201–203
See application file for complete search history.

(56) References Cited

U.S. PATENT DOCUMENTS

| | | | |
|---|---|---|---|
| 3,570,495 A | 3/1971 | Wright |
| 4,694,409 A | 9/1987 | Lehman |
| 5,069,219 A | 12/1991 | Knoblich |
| 5,174,281 A | 12/1992 | Lee |
| 5,193,549 A | 3/1993 | Bellin et al. |
| 5,518,021 A | 5/1996 | Loureiro Benimeli |
| 5,681,339 A | 10/1997 | McEwen et al. |
| 5,741,294 A | 4/1998 | Stromberg |
| 5,830,164 A | 11/1998 | Cone et al. |
| 5,876,359 A | 3/1999 | Bock et al. |

(Continued)

FOREIGN PATENT DOCUMENTS

FR 2678825 A 1/1993

(Continued)

*Primary Examiner*—Timothy L Maust
(74) *Attorney, Agent, or Firm*—Craig A. Fieschko, Esq.; DeWitt Ross & Stevens S.C.

(57) ABSTRACT

A pneumatic system consists of an inflatable/deflatable article, for example, a compression garment connected to a pump by connectors, respectively. The connector attached to the garment carries an RFID transponder and a corresponding radio circuit is located within the pump. In use, the transponder transmits and receives information to and from the pump radio circuit. The information exchanged is used by the pump control system to activate the pump and to operate the pump to provide the particular operating parameters for that garment, for example, pressure, inflation/deflation cycle duration of treatment, etc. The pneumatic system may include communication means for the pump, such as a radio circuit, that is located remote from the pump. Also, the pneumatic system may include a support mechanism that functions both as a handle and a hook.

28 Claims, 7 Drawing Sheets

U.S. PATENT DOCUMENTS

| | | |
|---|---|---|
| 5,938,634 A | 8/1999 | Packard |
| 5,947,168 A * | 9/1999 | Viard .......................... 141/1 |
| 5,966,083 A | 10/1999 | Marsh et al. |
| 6,070,687 A | 6/2000 | Wallace et al. |
| 6,148,888 A | 11/2000 | Loureiro Benimeli |
| 6,361,548 B1 | 3/2002 | McEwen |
| 6,884,255 B1 * | 4/2005 | Newton ..................... 606/202 |

FOREIGN PATENT DOCUMENTS

| | | |
|---|---|---|
| GB | 99/02403 | 9/1989 |
| GB | 2214678 A | 9/1989 |
| GB | 2264360 A | 8/1993 |
| GB | 2323453 A | 9/1998 |
| WO | WO 94/04398 A1 | 3/1994 |
| WO | WO 96/14785 A1 | 5/1996 |
| WO | WO 00/06904 A1 | 2/2000 |

* cited by examiner

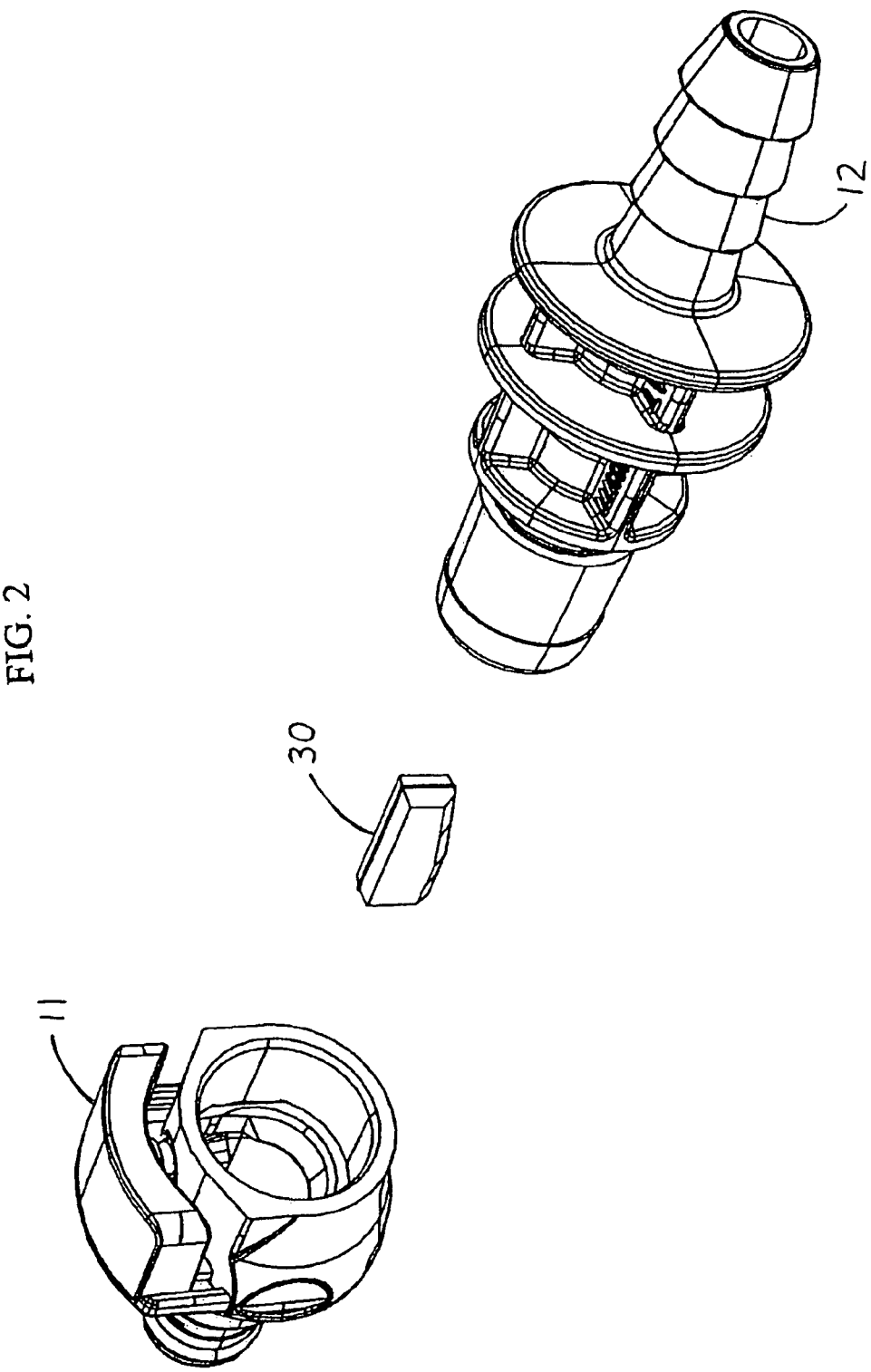

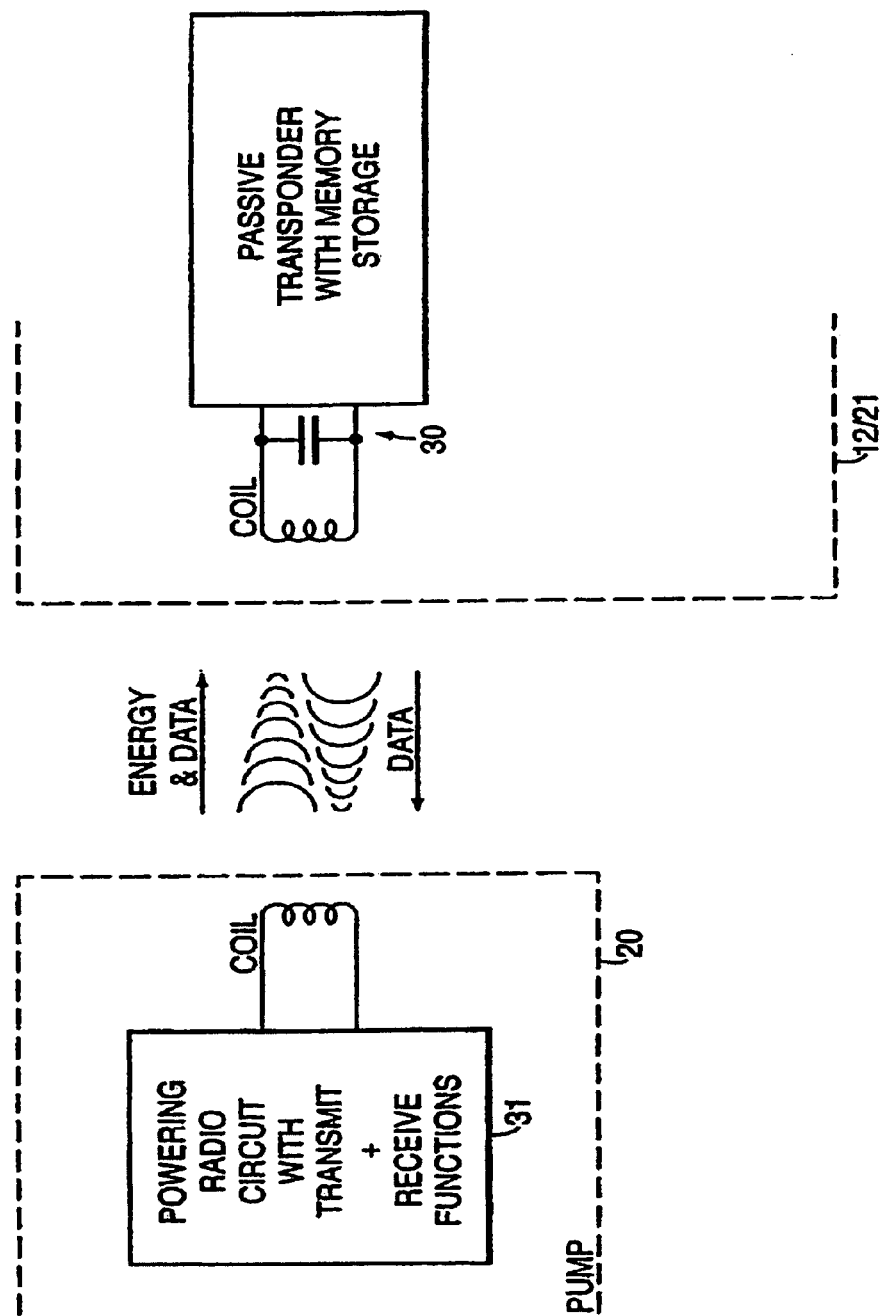

IDENTIFICATION AND COMMUNICATION SYSTEM FOR INFLATABLE DEVICES

CROSS-REFERENCE TO RELATED APPLICATIONS

This application claims priority to and is a continuation-in-part of U.S. application Ser. No. 09/509,265, entitled "IDENTIFICATION AND COMMUNICATION SYSTEM FOR INFLATABLE DEVICES", filed Jul. 25, 2000, now U.S. Pat. No. 6,884,255, which was the National Stage of and claims priority to International Application No. PCT/GB99/02403, filed Jul. 23, 1999, which claims priority to Great Britain Application No. 9816173.0, filed Jul. 25, 1998; this application claims priority to all three previous applications. The aforementioned U.S. application is hereby incorporated by reference in its entirety into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates to pneumatic systems and in particular to pneumatic systems having an inflatable/deflatable article connected to a fluid source, for example a pump.

It is known for such systems to have a coupling assembly connecting the article to the fluid source, the coupling assembly comprising a male insert and a cooperating female receptacle for receiving the male insert so as to form a coupled state. The male insert or female receptacle includes a mechanical latch cooperating with a cavity on a corresponding surface of the other for mechanically latching and unlatching the coupling assembly, the male insert member and the female receptacle both defining a pathway for the flow of fluid through it when in the coupled state. A seal member extends between the male insert member surface and the surface of the female receptacle to provide a fluid tight seal when in the coupled state.

WO96/14785 describes a pneumatic system comprising an inflatable mattress connected to a pump by a connector mounted on the end of a fluid line from the inflatable mattress, the connector being mechanically inoperable upon disconnection with the pump. In this way, the connector ensures that the inflatable mattress is used only once, for reasons of clinical safety. However, such pneumatic systems of the prior art including connectors that prevent re-use are not able to distinguish between different articles to be inflated or different pumps.

BRIEF SUMMARY OF THE INVENTION

Modern technology has now made it possible to design a pump to be programmable so that a number of different inflatable articles with differing inflating and/or deflating arrangements fulfilling totally different functions may be attached to a physically identical pump. Thus, there is a need for an intelligent means associated with the pump and/or the article able to identify or distinguish between the pump and the article connected, and further to control the operation of the pump appropriate to the article connected.

Accordingly, the invention provides a pneumatic control system including a pump and at least one inflatable/deflatable article, control means for operation of the pump, connection means for connecting the article and pump for fluid flow therethrough, communication means provided on each of the pump and article, wherein upon connection between the pump and article at least one of said communication means capable of identifying the article and instructing the control means to activate the pump accordingly.

Preferably, the communication means are capable of exchanging information or energy so as to identify the article as that compatible to the pump and more preferably instruct the pump control means to operate a predetermined inflation and/or deflation of the article.

The information exchange between the article and the pump may comprise information contained in the article communication means being read by the pump communication means and used by the pump control means to operate the pump, or information contained in the article communication means being read by the pump communication means, and information modified/generated within the pump communication means being stored within the article communication means during use. The information exchange may be by means of an energy source which may include but not be limited to electrical, pneumatic, acoustic, magnetic, electromagnetic or optical signals.

The modified information or energy transmitted to the pump is used to identify the article and thereafter used to control the pump operation either without user interface or to signal the user to operate the pump as indicated. Thus, operation of the pump may be altered automatically to match the requirements of the article to be inflated/deflated and its application.

Preferably, the information may include specific information, i.e. codes, to identify the article and/or its mode of operation (including pressure and flow versus time profile, and alarm settings) and/or security markings, to prevent unauthorised use.

In a preferred embodiment, the communication means on the article is located within the connection means connecting the article to the pump. Preferably, during use the respective communication means do not contact each other.

Examples of information contained within the article communication means may include some or all of the following data:

(i) Article serial number—for traceability in the event of customer complaint, product modification, recall or product ownership.

(ii) Article manufacturing date—the pump communication means can automatically infer that an article with a limited storage time from manufacture to use is out of time and therefore will not operate the pump, indicating so on the operator panel. This would be relevant to the case of single use sterile articles where the sterile packaging has a limited lifetime.

(iii) Article type information—the pump communication means reads the code and identifies the code as that to be used by the pump and sets up the correct pressure and flow versus time profiles on the air delivery paths automatically. Also the communication means on the pump can indicate to the user on the pump operator panel which application or applications the pump/article combination is intended for.

(iv) Single use/re-use information—indicates to the pump communication means to display on the operator panel whether the connected article is designed for re-use or for single use only.

(v) Duration of use information—this could either be in the form of the article in-use running hours or number of pressure time cycles per use or the actual times recorded when used. If this information is fed by the pump communication means back to the article communication means then it can be read by any pump communication means on subsequent usage. In this way users can be signaled when articles have reached the end of their operating life and for either clinical efficacy or safety reasons should no longer be used and whether user compliance of prescribed therapy has been administered. Also, the pump could be automatically shut-off or instructed to give appropriate warnings at the end of operating life/use.

(vi) Single Use Information—if the article communication means indicates application for single use only then the pump communication means can input in the article communication means, an indication that the article has already been used. On subsequent attempts to use the article the pump communication means will recognise single use has occurred and not operate. In this case the clinical efficacy and safety of a single use article can be preserved automatically.

(vii) Limited or Multiple Re-use—if this is indicated within the article communication means then the pump communication means will automatically clock up the number of use cycles, put the information into the article communication means, and when the designed number of use cycles has been reached, the pump can automatically indicate this to the user so preserving clinical safety and efficacy.

(viii) Re-usable clinical articles after being re-processed (consequent to use to eliminate cross-contamination between users)—here the pump communication means looks for an indication from the article communication means that the article has been validly reprocessed between use cycles. This validity information is placed in the article communication means at the reprocessing facility using an approved piece of equipment. In this way only approved reprocessing which maintains clinical efficacy and safety will be accepted by the pump for use.

Another aspect of the invention provides for the use of the information exchange outlined above, in the field of intermittent compression therapy and pressure area care.

Therefore, a preferred embodiment of the invention provides a pneumatic control system including a pump and an inflatable/deflatable support for a patient to lie on, control means to operate the pump, connection means for connecting the support and pump for fluid flow therethrough, wherein the pump and support have respective communication means, at least one said means capable of identifying the article and to instruct the pump control means to activate the pump accordingly.

Preferably, the said communication means are capable of exchanging information or energy to identify the support and to instruct the pump control means to operate the pump to provide a predetermined inflation/deflation of the support for a patient lying thereon. More preferably, the support communication means may be located within the connection means connecting the support to the pump.

A further preferred embodiment of the invention provides a pneumatic control system including a pump and at least one inflatable/deflatable garment to be wrapped around a user's limb, control means to operate the pump, connection means for connecting the garment and pump for fluid flow therethrough, wherein the pump and garment(s) have respective communication means, at least one said means capable of identifying the garment(s) and instructing the pump control means to activate the pump accordingly.

Preferably, the said communication means are capable of exchanging information or energy to identify the garment(s) and to instruct the pump control means to activate the pump accordingly and more preferably to further operate the pump to provide a predetermined inflation/deflation cycle of the garment(s) suited to the garments' application. Preferably, the garment communication means may be located within the connection means connecting the garment to the pump.

The use of communication means to provide pressure area care and compression therapy will result in fewer individual pump models being required for the different care applications, all requiring differing pneumatic performance criteria and operator interfaces. This will lead both to manufacturing economies of scale and substantial acquisition, storage and inventory cost reductions, which is particularly beneficial within the cost sensitive and resource limited healthcare establishments where such care applications are generally used.

The communication means can be separately applied to pumps and to the garments and supports so long as the air delivery path configurations are functionally compatible. Thus pumps could operate such articles yet to be developed so long as the articles have their operating characteristics configured in a compatible communication means attached thereto.

In a healthcare environment this use of communication means prevents the inadvertent and unsafe operation of pump types with inflatable garments or supports e.g. pads or mattresses, which are not functionally safe or clinically compatible. A pump equipped with the communication means will readily deliver safe, effective therapy with a wide range of such inflatable articles.

The communication means of the present invention for information exchange between an article and a pump to control operation of the pump may comprise conventional read and write information systems; examples of which, include bar code, magnetic stripe coding, insertion/rotation of co-operating connectors when connecting an article to the pump; geometry or intensity of magnetisation or transmissive or reflective optical path read by sensors; unique combinations of mechanical shapes read by mechanical switches or electronic memory chip with memory retention without power, for example, flash memory or EEPROM or UV EPROM.

A further embodiment of the invention provides a pneumatic control system including a pump, at least one inflatable/deflatable article, control means for operation of the pump, connection means for connecting the article and pump for fluid flow therethrough, communication means provided on each of the pump and article wherein at least one of said communication means has the ability, upon connection between the pump and article, to identify the article and to instruct the control means to activate the pump accordingly, and where the communication means of the pump may be remotely located from the pump. For example, a connection means may be coupled to the pump with the communication means of the pump being located within the connection means at a position distal to the pump.

A further aspect of the invention is the use of a novel handle for the pump wherein the handle is shaped so as to be capable of functioning as either a carrying handle or a bed hook.

BRIEF DESCRIPTION OF THE DRAWINGS

The invention is illustrated in the figures of the accompanying drawings which are meant to be exemplary and not

FIG. 2 shows a schematic diagram of a communication means according to the present invention;

FIG. 3 shows a typical radio communication means comprising a passive transponder and powering radio circuit;

DETAILED DESCRIPTION OF THE PREFERRED EMBODIMENTS

Figure 1:
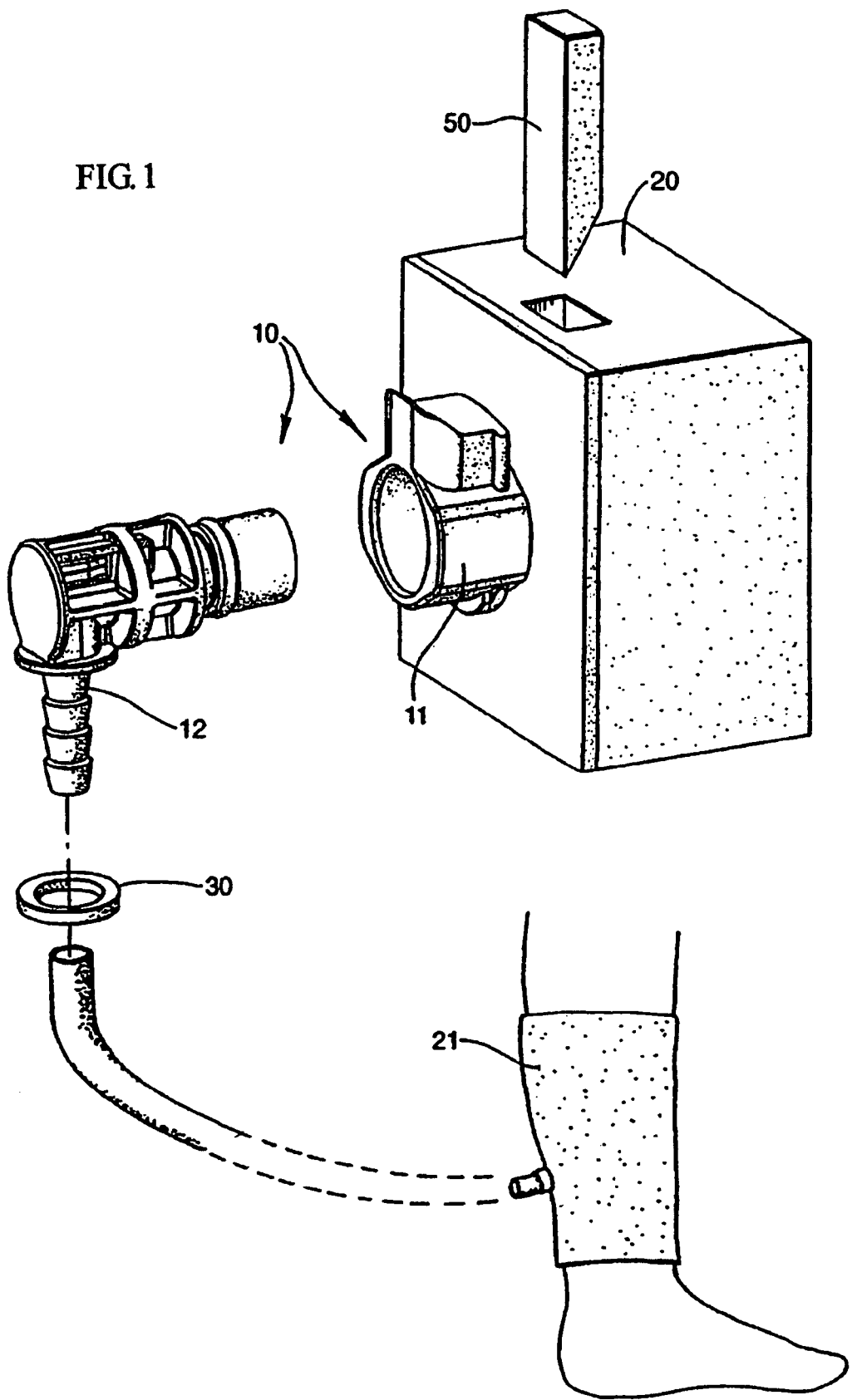
FIG. 1 shows a schematic diagram of a communication means on the pump according to the present invention.
Figure 1A:
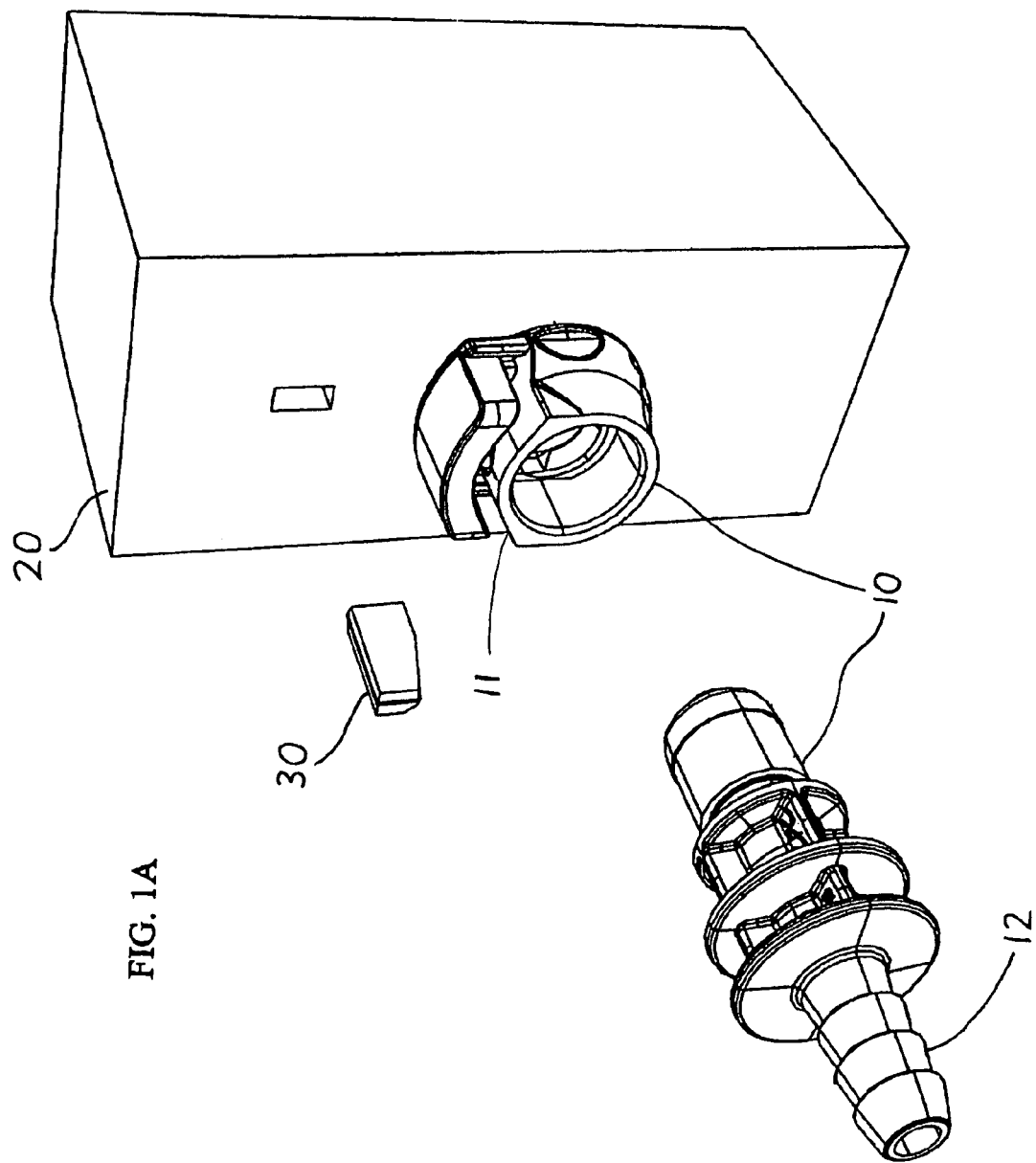
FIG. 1A shows a schematic diagram of a communication means on the pump according to the present invention.

Referring to FIG. 1, the preferred embodiment consists of a pneumatic system consisting of a compression garment 21 connected to a pump 20 by a connector 10. The connector 10 has a connector part 11 connected to the pump 20 and a cooperating connector part 12 connected to the fluid line of the garment 21. The connector 12 carries a radio frequency identification device 30, i.e. a transponder (FIG. 2). The transponder 30 is mounted on the connector part 12 connecting the compression garment 21 to the pump 20 and a corresponding radio circuit is located within the pump 20. The transponder 30 may be in the shape of an annular ring fitted to the connector part 12 surrounding its fluid line outlet or any suitable shape to fit on or adjacent the connector 12. The transponder 30 typically comprises a coil 32 acting as an antennae to transmit and receive signals, a capacitor to temporarily store energy to power the transponder, an integrated circuit to provide control and modulation functions and a read/write electronic memory (EEPROM). The transponder 30 is used to transmit and receive information to and from the pump radio circuit 31. As shown in FIG. 3, radio circuit 31 in the pump comprises coils 32 located close to the pump outlet to provide for transponder power and two-way communication between the transponder 30 and the circuit 31. The transponder 30 is passive and does not need any power to store information. It is energised by coming into proximity with the coils 32 of the radio circuit 31 in the pump 20 and can then communicate with the pump circuit 31. As the transponder 30 does not need power to store information there is no need for connection cables or batteries and it may be completely sealed after assembly, within connector part 12 attached to the compression article 21.

The transponder memory may be a read/write memory (as described above) or alternatively a read only memory. The transponder may contain varying amounts of non-volative memory for the storage of information as described below.

Furthermore, the transponder 30 may have any shape, including, for example, any ISO agreed shape. During manufacture, the transponder may be placed into the connector part of the inflatable/deflatable article in any number of ways, e.g., by inserting the transponder lengthways into a suitably sized hole in the connector part of the inflatable/deflatable article, e.g., compression article 21.

The communication between the transponder 30 and pump 20 is controlled by hardware and software within the pump.

The operation of the pump 20 is programmable, specifically the operation in terms of applied pressure and flow versus time profiles and alarm monitoring. This is achieved by having the key parameters which control this operation stored in the transponder 30 to be read by the radio circuit 31 in the pump 20 and used to operate the pump accordingly. Thus by changing a garment 21 the operation of the pump 20 may be changed and hence the pump 20 may be programmable by the garment 21.

Data required to be stored in the transponder, e.g., the key parameters for controlling the operation of the pump, may be programmed into the transponder in various manners and at any suitable stage of use. For example, a programming station may be used to input this data into the transponder when the connector and inflatable/deflatable article assembly has been completed.

The general approach is for the pump software to signal to the transponder via the radio link a request to transmit certain operational parameters. These are received by the pump radio link and used as a basis to operate the pump. For example, if the pressure is specified for the article then the pump will provide that particular pressure.

It is the information stored in the transponder within the connector on the article which indicates to the pump to operate accordingly. Specific examples of parameters include:

Operating parameters—operating pressure level, pressure versus time inflation rate, pressure versus time deflation rate, duration of inflation, duration of period between inflation's.

Alarm parameters, the pressure at which an inflation characteristic is detected, time at which this is tested, number of fault conditions prior to alarm occurring. This would be duplicated for each alarm condition.

In use, the connector parts 11,12 are joined together. The transponder 30 within the garment connector part 12 when coming into the vicinity of the pump's radio circuit 31 is powered and responds by transmitting a signal to the pump radio circuit 31. The radio circuit 31 may request further information from the memory of the transponder 30 or it may modify some of the transponder memory 30. The pump 20 processes the information it has read from the transponder 30 and accordingly provides the specific inflation requirements for that garment 21.

The pump 20 is reconfigured after any break in its operation, for reasons of it being switched off, powered off or another garment being connected.

The radio circuit 31 reads the information within the transponder 30 memory on the connector part 12 of a garment 21 and identifies the garment 21 and if the information is compatible with that held within the pump 20 either electronically or within the software, then the pump operates the garment 21 according to the information transmitted by the transponder 30. In the case of single-use garments, the transponder memory 30 may contain additional control information which instructs the pump not to re-inflate or not to inflate after a certain time or any other parameter based decision process. Additionally, the radio circuit 31 may modify the transponder 30 memory to prevent further re-use of the garment 21 upon re-connection with the or another pump.

The pump 20 may be configured so that it is solely dependent on the transponder 30 memory to provide information regarding the inflation requirements of the garment 21 attached. This allows for new garments to be connected and operated by the pumps without the pumps' having to be upgraded.

The pump radio circuit 31 and transponder 30 could exchange information about the following:

The transponder 30 in the garment connector could be used to store information about the pump's own operational history—e.g. time since last service, alarm history, degree of utilisation etc. This information could then be accessed by the manufacturer or its agents without physically having to gain access to the pump. This is an advantage where the pumps are spread widely geographically or where access is restricted due to commercial reasons.

The opposite arrangement is also possible where the pump radio circuit 31 captures all the usage information stored within the garment connector transponder 30 (which could be a history involving many pumps). During servicing of the pump 20 the information is accessed as part of the service procedure.

This sort of information would allow better understanding of the actual pump/garment usage in healthcare establishments which may provide useful information for commercial, product reliability and quality and clinical efficacy purposes.

The facility to remotely upgrade the operation/disable use/enable use of the pump is possible.

The pump could include a transponder itself to self check that its own radio circuit 31 is working and further could be adapted to accommodate an external transponder 50. The external transponder 50 may be in the form of a programming key which when connected to the pump 20, in the vicinity of the radio circuit 31 would specifically configure the operation of the pump 20 and any garments 21 together as a system for a specific patient in a healthcare environment. This key could be configured by a physician for a particular patient's requirements. The key would override any existing settings stored in the pump and/or garments and ensure that the required pump operation occurred. Thus, improved patient compliance and increased product safety and efficacy would result. Other transponders or similar could be used to log operational data for maintenance purposes.

The pneumatic system above describes a pump 20 having a radio circuit 31 communicating with a radio frequency identification device (RFID) 30 on a connector 12 to a garment 21. The radio circuit 31 within the pump 20 also contains a phase detection circuit which can be used to detect any change of phase due to external influences and this principle may be employed as an alternative communication means for the pneumatic system.

A number of materials can be used to change the phase of the coil 32, examples are shown in table 1.

| Material | Phase Change in Degrees |
| --- | --- |
| Magnetically loaded plastic | +45 |
| Torrid Core | +11 |
| Amorphous metal strip | +50 |
| Steel Core | −17 |
| Cable screen ferrite 10 mm | +62 |
| Cable screen ferrite 5 mm | +28 |
| Brass Core | −22 |

In the case of brass the introduction into the coil field lowers the phase detected by the phase detector, and conversely the use of ferrite increases the phase detected, resulting in different values for differing materials. The phase angle change can be controlled by the amount of material within the coil field and by this method several identities can be detected.

The materials listed in table 1 may be fashioned into any suitable shape, e.g., a ring shape, and may be so fashioned in a variety of ways, such as computer numerically controlled ("CNC") machining in the case of brass, or compression/extrusion in the case of ferrite. The shaped material, e.g., a ring of material, is then inserted into the end of the connector part of the inflatable/deflatable article, e.g., garment 21. This insertion allows for ease of assembly during manufacture of the inflatable/deflatable article as the ring of material may simply be pressed into the end of the article's connector part.

Also, to help insure correct assembly, the different types of material may be fashioned into shapes, e.g., rings, of different sizes. Where specific types of articles are meant to be used with specific types of material, the connector part of an article may be sized so as to only fit with the type of material having a shape and size corresponding to that type of article. For example, an article designed for foot applications may have a connector part that only successfully fits with a brass ring. In another example, there may be two types of articles designed for calf and calf/thigh applications but two different therapies, e.g., multi-chamber sequential and standard single bladder DVT therapies. Two different sized ferrite rings may be used with each size corresponding to and correctly fitting to only one of the two types of articles.

It should be noted that the phase change measurements listed in table 1 are only exemplary and the specific material characteristics of the materials and their relative positions (when the connector parts of the article and pump are connected together) to the coil 32 of the pump communication means, e.g., a pump radio circuit, are important in setting the actual degree of change of the phase angle.

Use of the ferrite and brass materials is advantageous, for example, because they are low in cost, easily obtainable, easily formed into a variety of suitable shapes, and are more environmentally sound since they are not associated with any disposal issues.

As shown by the phase changes listed for each material in table 1, the two different sizes of ferrite and the brass provide for three distinct codings which may serve to uniquely identify various types of inflatable/deflatable articles to a pump.

Figure 4:
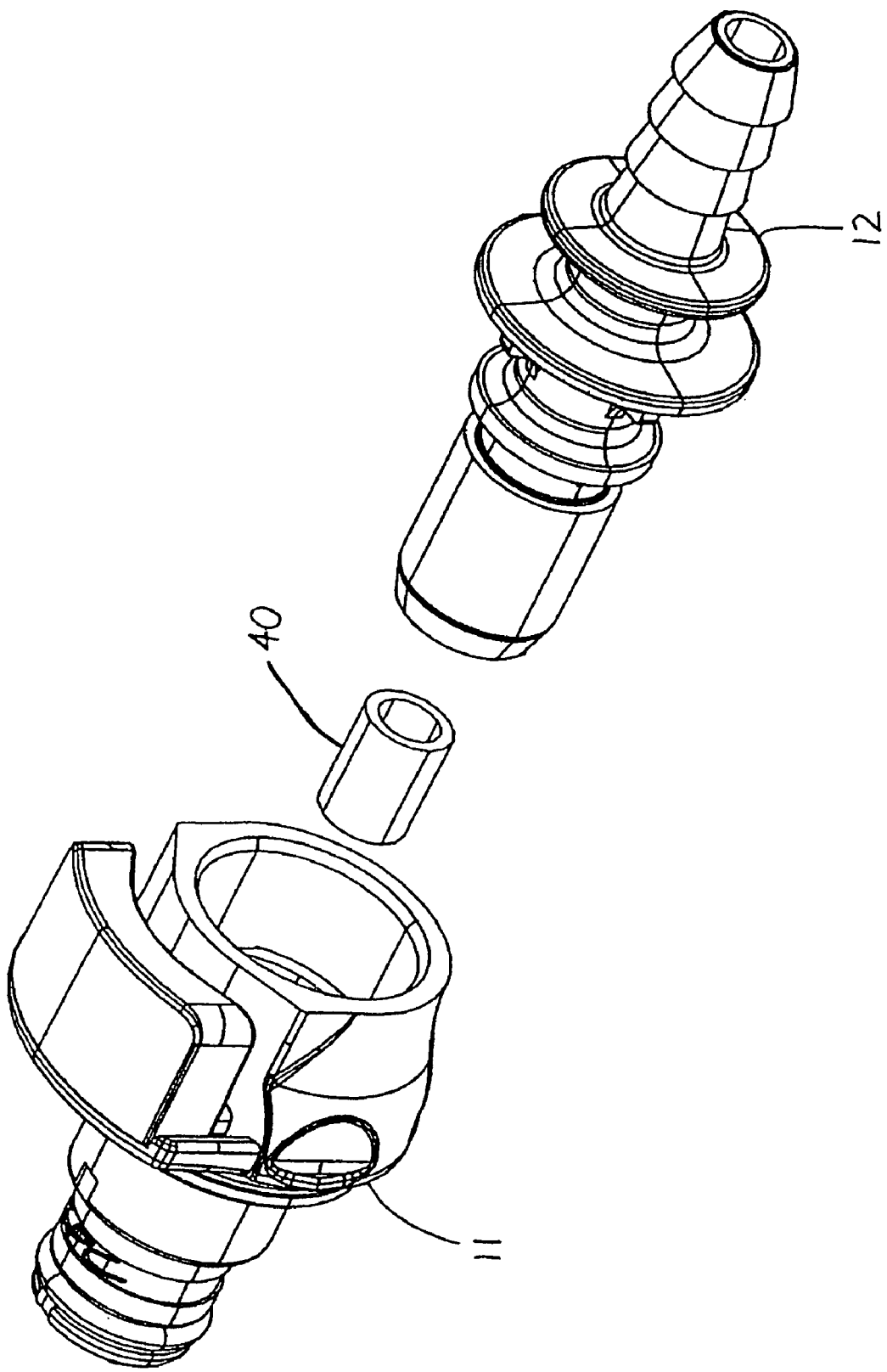
FIG. 4 shows an alternative embodiment of a communication means.

FIG. 4 shows an alternative system using the pump 20 as in FIG. 1 and a connector 12 to a garment 21 (not shown), the connector 12 having communication means including an annular ring of ferrite 40 around the fluid line outlet.

In use, the connector parts 11, 12 are joined together. The ferrite 40 when coming into the vicinity of the pump's radio circuit 31 increases the phase detected by the phase detection circuit within the pump 20 and accordingly identifies the garment 21 (not shown) and if the phase change information is held to be compatible with the pump 20 either electronically or within the software, then the pump 20 may be operated to provide the therapy required.

As described above, a fluid line, through which a fluid may flow, may be used to connect the inflatable/deflatable article with the pump. In some situations, it may be desirable for such a fluid line to be integrally coupled, e.g., integrally attached, to the pump rather than the article. For example, where many articles are to be used for one or only a few pumps, then it may be less costly to integrally couple fluid lines to the pumps rather than to each of the articles, since fewer fluid lines would be needed and the articles themselves, without each having a fluid line, would be less costly. Also, where an article is intended for a single use, e.g., a disposable garment, integrating the fluid line with the pump rather may be more environmentally preferable, since the fluid line is reused rather than discarded.

Figure 5:
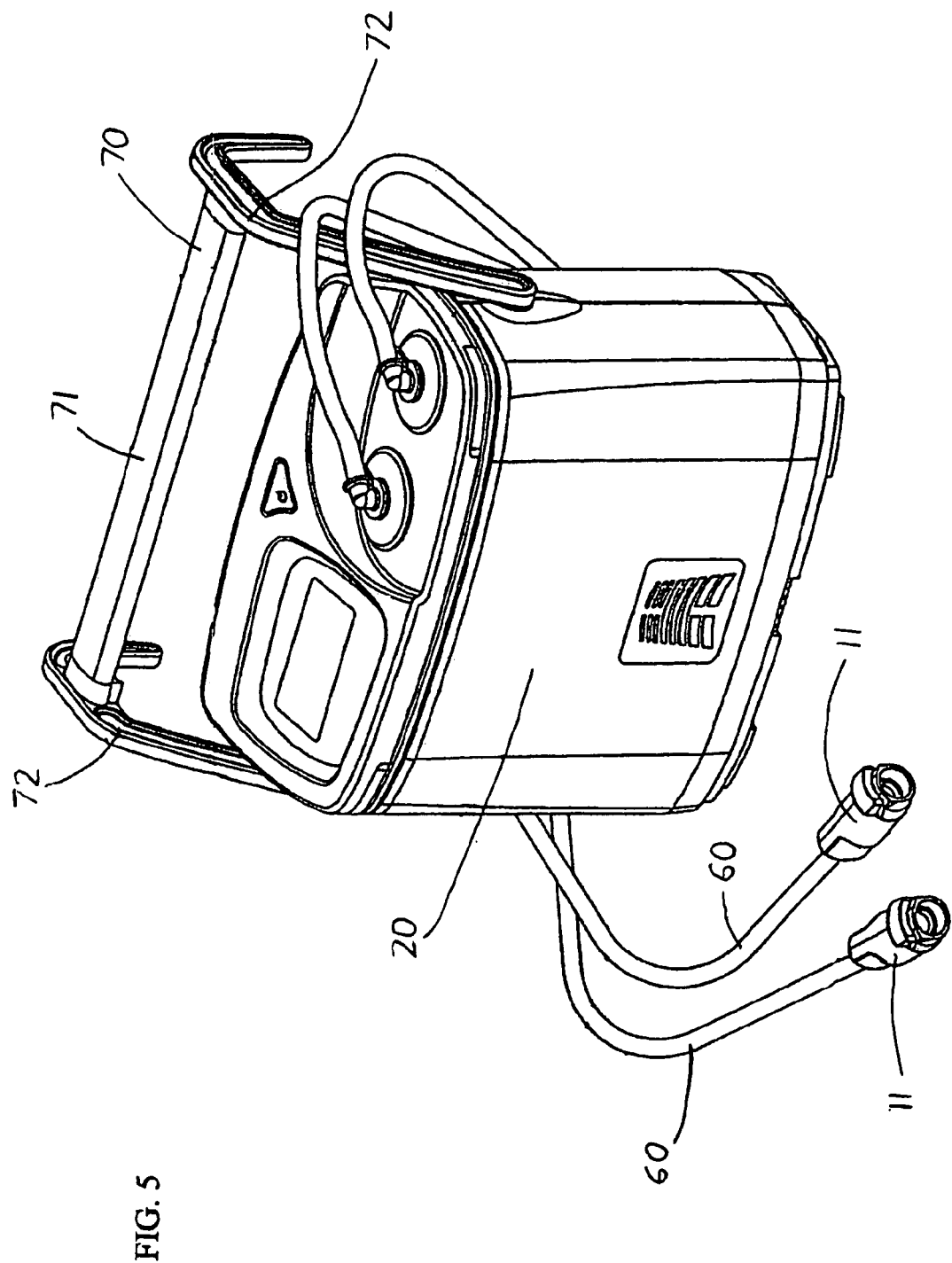
FIG. 5 shows an embodiment of a pump with a support mechanism.

FIG. 5 shows another embodiment of the pneumatic system of the present invention where fluid lines are integrally coupled to a pump. The pump 20 has fluid lines 60 integrally coupled it. At the end of fluid lines 60 distal to pump 20 are connector parts 11 which connect to cooperating connector parts 12 (not shown) that are attached to the inflatable/deflatable article 21 (not shown). The communication means of the pump 20 may be located in the connector parts 11 situated at the end of the fluid lines 60. Thus, in this configuration, the communication means of the pump are remotely located from the pump.

Figure 6:
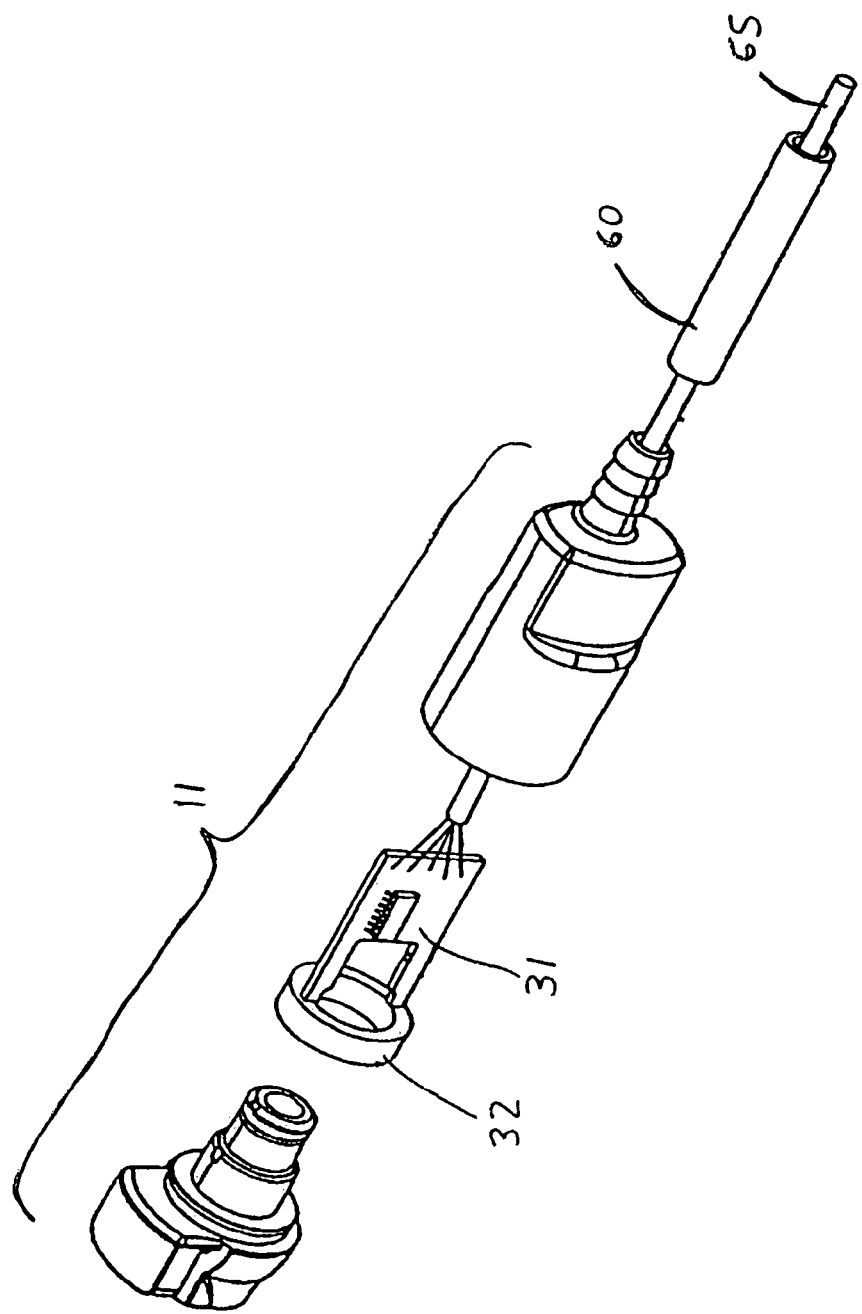
FIG. 6 shows a schematic, partially exploded cross-sectional view of an embodiment of a connection means and communication means.

The communication means of the pump may be any device capable of exchanging information, such as, for example, the radio circuit 31 previously described. FIG. 6 shows a disassembled view of the connector part 11 and the end of the fluid line 60. The housing of the connector part 11 has barbs which allow the fluid line 60 to be connected to the connector part 11 by pushing the fluid line 60 over the barbs. The connector part housing contains the communications means of the pump, e.g., radio circuit 31. A cable 65 may run through the fluid line 60 from the pump to the communications means of the pump and may be used to supply power to the communications means and to provide signal communication between the communication means and the controlling hardware and software, described previously, within the pump.

Many alternate configurations of the pneumatic system of the present invention are possible. For example, for seating applications, including wheelchairs, the pump may have fluid lines integrally coupled it, as described above. However, with seating applications, the fluid lines may be short, e.g., 400 mm, compared with than non-seating applications, since the pump and the inflatable/deflatable article, e.g., a seat pad, may be close together. The article itself may have fluid lines, one with a male end and the other with a female end, such that when the article is not connected to the pump, e.g., during transportation, the fluid lines of the article may be cross-connected so that the article remains permanently inflated without the pump. In such a configuration, the communication means of the article may be located in the connector part attached to the article and the communication means may be any of the several types previously described, e.g., a RFID transponder or ferrite.

Another possible configuration may include inflatable/deflatable article on which a patient may lie down, e.g., a mattress. In such a configuration, the communication means of the pump, e.g., a radio circuit and coil 32 as previously described, may be located within the pump casing. The article may have an attached fluid tube with a connector part that connects to the pump manifold and includes one of the types of communication means previously described, e.g., a RFID transponder.

Still a further possible configuration may include inflatable/deflatable articles that are worn, e.g., IC treatment garments. In such a configuration, the communication means of the pump, e.g., a radio circuit and coil 32 as previously described, may be located within the pump casing. The wearable article may have a connector part includes one of the types of communication means previously described, e.g., a RFID transponder.

Another aspect of the pneumatic system of the present invention involves a novel support mechanism for the pump. Referring again to FIG. 5, the pump 20 is shown fitted with a support mechanism ("the support") 70. The support 70 comprises a transverse member 71 and two side members 72 connected to the ends of the member 71. The side members 72 have two ends. One end attaches the support 70 to the pump 20. The other end of each side member 72 is in the form of a hook.

The support 70 has several advantages. First, the support 70 simultaneously provides multiple support functions. Pumps currently in use generally have supports which provide one functionality. For example, some supports act as a handle, while other supports serve as bed hooks. However, the support 70 of the present invention is novel in that it provides several possible support functions in one mechanism. One possibility involves using member 71 as a handle to carry the pump. Alternatively, the hook ends of members 72 may be used to hang the pump on another object, e.g., a bed.

Another advantage of the support 70 is that the side members are attached to the center of the sides of the pump 20. Conventional bed hooks are generally fitted on the back of a pump. Consequently, when such a pump is hung from a bed, it does not hang squarely. However, the side members 72 being attached to the center of the sides of pump 20 allows support 70, when used as a hook, to act on the center line of the pump 20 which in turn allows the pump 20 to hang squarely on a wide range of objects, e.g., bed boards and equipment rails.

The construction of the support 70 also provides several advantages. For example, transverse member 71 may be made from aluminum or other extrusion so that member 71 may be finished and/or printed in a variety of ways which allows for various product variants to be identified. Also, an aluminum extrusion could be replaced with an overmolded plastic part to produce an assembly that would be much cheaper than overmolded wire. The side members 72 may be manufactured from injection molded plastic, rather than the conventional bent metal rod, to enable a cost effective and aesthetically pleasing design that may be also very robust. Also, the support 70 is simple to assemble and may be easy to replace with certain case types, for example, where the case is held together by only four screws.

While the preferred embodiments describe intermittent garments incorporating connectors having various types of communication means, it is understood that mattresses as well as any other inflatable/deflatable articles may be similarly connected and inflated/deflated using the same principles according to the invention. Moreover, the respective communication means within the article and the pump may be located elsewhere than the connectors as in the preferred embodiment, for example, within the inflatable article and/or pump casing. The preferred embodiments have described connectors using a means of information exchange or identification incorporating a radio frequency identification device (RFID) or ferrite material respectively, however any other forms of information exchange devices as discussed earlier or as would be apparent to those skilled in the art are within the scope of the invention.

What is claimed is:

1. A pneumatic control system comprising:
   a pump;
   at least one inflatable/deflatable article;
   control means for operation of the pump;
   connection means for connecting the article and pump for fluid flow therethrough;
   communication means provided on each of the pump and article wherein at least one of the communication means, upon connection between the pump and article and with the pump's communication means remaining on the pump and the article's communication means remaining on the article, wirelessly identifies the article and instructs the control means to activate the pump accordingly; and wherein the communications means of the pump is remotely located from the pump; and further wherein the communication means of the pump includes a radio circuit, wherein the radio circuit generates a radio field and is capable of measuring phase changes in the radio field; and further wherein the communication means of the article includes material that causes a phase change in the radio field.

2. The pneumatic control system as claimed in claim 1, wherein the communication means are capable of exchanging information or energy so as to identify the article as that compatible to the pump and to instruct the pump control means to operate a predetermined inflation and/or deflation of the article by the pump accordingly.

3. The pneumatic control system as claimed in claim 1, wherein the communication means on the article is located within the connection means.

4. The pneumatic control system as claimed in claim 1, wherein during use the respective communication means do not contact each other.

5. The pneumatic control system of claim 1, wherein the communications means of the pump is located within the connection means.

6. The pneumatic control system of claim 1, wherein the connection means is integrally coupled to the pump; and wherein the communications means of the pump is located within the connection means in a position distal from the pump.

7. The pneumatic control system of claim 1, wherein the communication means of the article includes a radio frequency identification device.

8. The pneumatic control system of claim 7, wherein the radio frequency identification device includes a read only memory.

9. The pneumatic control system of claim 7, wherein the radio frequency identification device includes a read/write memory.

10. The pneumatic control system of claim 1, wherein the phase change caused by the material is related to the type of material.

11. The pneumatic control system of claim 1, wherein the phase change caused by the material is related to the size of the material.

12. The pneumatic control system of claim 1, wherein the material includes magnetically loaded plastic.

13. The pneumatic control system of claim 1, wherein the material includes a torrid core.

14. The pneumatic control system of claim 1, wherein the material includes an amorphous metal strip.

15. The pneumatic control system of claim 1, wherein the material includes a steel core.

16. The pneumatic control system of claim 1, wherein the material includes cable screen ferrite.

17. The pneumatic control system of claim 1, wherein the material includes a brass core.

18. The pneumatic control system of claim 1, wherein the material is selected from the group consisting of cable screen ferrite of a first size, cable screen ferrite of a second size, and brass.

19. The pneumatic control system of claim 1, wherein the article includes a seat pad.

20. The pneumatic control system of claim 1, further comprising a support mechanism capable of functioning as a handle and a hook.

21. A pneumatic control system including:
a. at least one inflatable/deflatable article having an article connector with an article connector air passage through which air may be received into, or released from, the article;
b. a pump having a pump connector with a pump connector air passage through which air may be supplied or withdrawn, wherein:
(1) the pump connector is connectable to the article connector,
(2) upon connection between the pump connector and the article connector with the pump connector air passage and article connector air passage in communication, at least one of the connectors:
(i) wirelessly reads information encoded in the other connector, without the use of electrical conduction between the connectors to communicate the information; and
(ii) activates the pump to supply or withdraw air to the article in accordance with the encoded information, wherein the connector bearing the encoded information includes phase change material therein, the phase change material having a composition, size, and/or configuration such that radio waves emitted by the other connector are reflected by the phase change material with a change of phase in the radio waves.

22. The pneumatic control system of claim 21 wherein the encoded information includes an identification of the article.

23. The pneumatic control system of claim 21 wherein the encoded information includes instructions for deflation of the article.

24. The pneumatic control system of claim 21 wherein the pump connector is located distantly from the pump, with an elongated fluid communication line extending between the pump and the pump connector.

25. The pneumatic control system of claim 21 wherein the connector wirelessly reading the information:
a. emits radio waves, and
b. detects changes in the phase of the radio waves when returned from the other connector.

26. The pneumatic control system of claim 21 wherein the article is one of:
a. a seat pad whereupon a patient may sit,
b. a mattress whereupon a patient may be situated, and
c. a garment wearable about at least a portion of a patient's body.

27. A pneumatic control system including:
a. at least one inflatable/deflatable article, the article being one of:
(1) a seat pad whereupon a patient may sit,
(2) a mattress whereupon a patient may be situated, and
(3) a garment wearable about at least a portion of a patient's body, the article having an article connector with an article connector air passage through which air may be received into, or released from, the article;
b. a pump having a pump connector with a pump connector air passage through which air may be supplied or withdrawn, wherein:
(1) the pump connector is connectable to the article connector,
(2) when the pump connector and the article connector are connected with the pump connector air passage and article connector air passage in communication, the pump is activated to supply air to, or withdraw air from, the article via the article connector, in accordance with information received wirelessly from the article connector without the conduction of electrical signals between the connectors,
wherein the article connector includes phase change material therein, the phase change material having a composition, size, and/or configuration such that radio waves emitted by the pump connector are reflected by the phase change material with a change of phase in the radio waves.

28. The pneumatic control system of claim 27 wherein the information received wirelessly from the article connector includes an identification of the article.

* * * * *